(12) United States Patent
Nolan et al.

(10) Patent No.: US 8,108,335 B2
(45) Date of Patent: Jan. 31, 2012

(54) TECHNIQUES FOR INTEGRATING DISPARATE DATA ACCESS MECHANISMS

(75) Inventors: Ellen Nolan, San Diego, CA (US); Michael Eschwege, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 558 days.

(21) Appl. No.: 11/778,709

(22) Filed: Jul. 17, 2007

(65) Prior Publication Data

US 2009/0024594 A1    Jan. 22, 2009

(51) Int. Cl.
*G06F 17/00* (2006.01)

(52) U.S. Cl. ......................................... 707/602; 707/605

(58) Field of Classification Search .................. 707/602, 707/708, 605, 791
See application file for complete search history.

(56) References Cited

U.S. PATENT DOCUMENTS

| | | | |
|---|---|---|---|
| 6,560,594 B2 | 5/2003 | Cochrane et al. | |
| 7,028,046 B2 | 4/2006 | Anjur et al. | |
| 7,171,427 B2 | 1/2007 | Witkowski et al. | |
| 7,752,230 B2 * | 7/2010 | Bland et al. | 707/802 |
| 2003/0182300 A1 | 9/2003 | Anjur | |
| 2004/0015513 A1 | 1/2004 | Petrulescu | |
| 2004/0260671 A1 | 12/2004 | Potter | |
| 2005/0027690 A1 | 2/2005 | Zhang et al. | |
| 2005/0114248 A1 * | 5/2005 | Dupont et al. | 705/36 |
| 2005/0120051 A1 * | 6/2005 | Danner et al. | 707/104.1 |
| 2005/0256896 A1 * | 11/2005 | Pfeifer et al. | 707/102 |
| 2006/0020608 A1 | 1/2006 | D'Hers | |
| 2006/0112123 A1 * | 5/2006 | Clark et al. | 707/101 |
| 2007/0094233 A1 * | 4/2007 | Otter et al. | 707/1 |
| 2007/0282803 A1 * | 12/2007 | Asghar et al. | 707/3 |
| 2008/0086478 A1 * | 4/2008 | Hermann et al. | 707/10 |

* cited by examiner

*Primary Examiner* — James Trujillo
*Assistant Examiner* — Linh Black
(74) *Attorney, Agent, or Firm* — Schwegman, Lundberg & Woessner

(57) ABSTRACT

Techniques for integrating disparate data access mechanisms are provided. A user attempts data access against an infocube and its data access mechanism. Transparently, that access attempt is translated into a format recognized and processed by a relational database access mechanism to produce results. The results are then translated from a relational database format back to an infocube format and presented to the user within the infocube's data access mechanism.

14 Claims, 3 Drawing Sheets

TECHNIQUES FOR INTEGRATING DISPARATE DATA ACCESS MECHANISMS

BACKGROUND

Enterprises are increasingly capturing, storing, and mining a plethora of information related to communications with their customers and related to their day-to-day internal operations. Often this information is stored and indexed within databases. Once the information is indexed, queries are developed on an as-needed basis to mine the information from the database for a variety of organizational goals, such as marketing, planning, reporting, etc.

The information does not always have to be modeled within an enterprise in conventional relational database format. For example, the information may be modeled using object oriented (OO) database technology or even infocube technology.

The data model initially chosen by an enterprise can also change over time as the information management needs of the enterprise change. For example, an enterprise may not have a large amount of information in the beginning stages of its operations and may believe that an infocube model is most beneficial; however, as the enterprise matures the volume of information increases and the infocube model may prove to be impractical for the enterprise to maintain and thus the enterprise may transition to a relational database data model.

When an enterprise transitions from one data model to another, the front-end interfaces associated with the prior data model may include benefits that the enterprise is reluctant to let go of, such as report generating, query processing, etc. Yet, there is little ability to integrate the data access mechanisms associated with one data model with that of another, especially when it relates to the front-end interfaces of the data models. So, enterprises are often forced to relinquish useful applications that they have grown skilled in and have relied upon when the enterprises switch its underlying data model.

Thus, improved techniques for integrating disparate data access mechanisms are desirable.

SUMMARY

In various embodiments, techniques for integrating disparate data access mechanisms are presented. According to an embodiment, search criteria is received via an infocube interface from a user. The search query includes a time-dependent constraint. Next, processing automatically transitions from the infocube interface to a relational database using a relational database interface to search the relational database and to acquire an answer set that conforms to the search criteria having the time-dependent constraint. Finally, the answer set is automatically translated to a data format used and recognized by the infocube interface and it is presenting to the user within the infocube interface.

DETAILED DESCRIPTION

Figure 1:
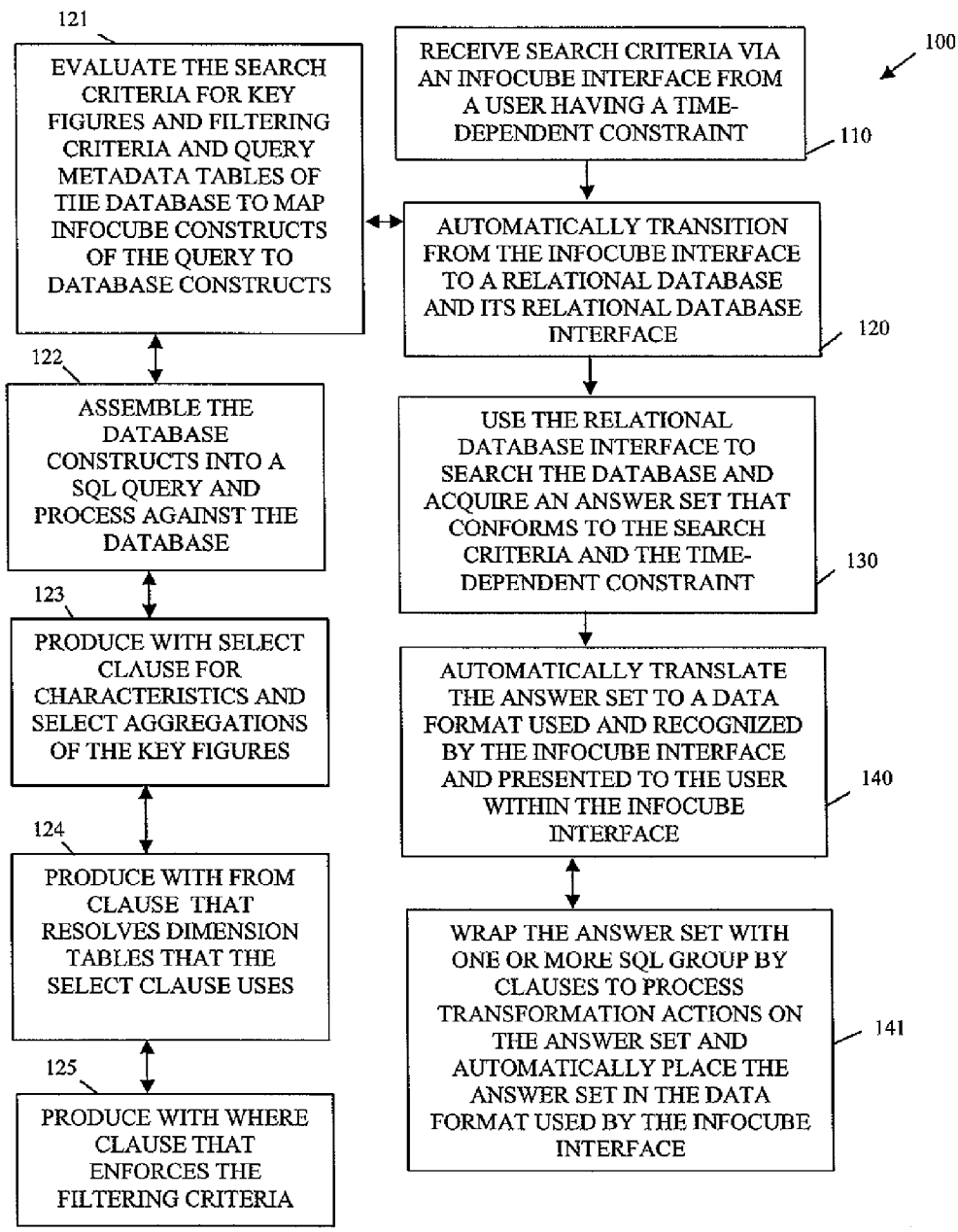
FIG. 1 is a diagram of a method for integrating disparate data access mechanisms, according to an example embodiment.

FIG. 1 is a diagram of a method 100 for integrating disparate data access mechanisms, according to an example embodiment. The method 100 (herein after referred to as "relational database service") is implemented in machine-accessible or computer-readable media as instructions and is executed by one or more machines (processing devices). Moreover, the relational database service is accessible over a network. The network may be wired, wireless, or a combination of wired and wireless.

An "infocube" is a customized package of information that includes its own internal data representation and interface to access that data. An example of an infocube would be a SAP® Infocube. The infocube in SAP® is a type of object that can function as both a data target and as a provider of information. It includes its own access mechanisms and manages its own data. It is to be understood as used herein that the infocube is not limited to a SAP® application, as it may be used in connection with any non-relational database data source, such as an objected oriented (OO) database application or any customized data sources, which are non-relational.

Various techniques presented herein utilize a "virtual infocube" implementation. The virtual infocube presents itself to a user as if it was an infocube and provides all the infocube interfaces expected and used by the user; however, the actual data or information access is achieved via pointers and translations to a relational database backbone, where the data or information actually resides and is manipulated on behalf of the user.

A "key figure" is any quantifiable measure or value for data, such as sales volume, summations of values, minimum values, maximum values, etc. Key figures are thus measures or values that a user desires to analyze. The data or information for the key figures reside in the infocube from the perspective of the user; although as will be demonstrated herein and below that data is actually present in a relational database, such that the infocube is in fact a virtual infocube (as discussed above).

"Non-cumulative key figures" are values that cannot be directly totaled from one source. For example, the value of stock over time cannot be summed to obtain its value. Yet, sales volume can be summed to obtain its value over time. So, the sales value is a cumulative key figure whereas the stock is a non-cumulative key figure. Non-cumulative key figures are often stored with a time constraint to assist in more intelligently processing the non-cumulative key figures.

Data "characteristics" are attributes associated with types of data. Thus, characteristics can be constraints related to time, quantity, identity, color, description, etc. Characteristics can be associated with key figures or other types of data that are not key figures.

In an embodiment, the relational database used with the techniques presented herein is a Teradata data warehouse product, distributed by NCR, Corporation of Dayton, Ohio.

It is within this initial context that the processing associated with the column partitioning index service is now discussed in detail.

At 110, the relational database service receives search criteria via an infocube interface from a user. That search constraint includes at least one time-dependent constraint. Receipt of the search criteria can occur via a variety of mechanisms.

For example, the relational database service may actively listen for infocube events or actions occurring within the infocube interface that indicate a search request or other data access operation is occurring. Alternatively, the infocube interface can be modified to actively report these types of operations when it might not otherwise, such that the relational database service can receive notice of the search criteria. So, the relational database service can actively be configured to detect the data access operations including the search criteria or the infocube interface itself can be configured to report these things to the relational database service.

According to an embodiment, the relational database service may come equipped with its own interface that permits an administrator or user to actively configure some information and create, modify, delete, and manage infocubes. Specific infocubes can also be directly linked to specific relational databases and manually mapped using the administrative interface of the relational database service.

At 120, the relational database service automatically transitions from the infocube interface to a relational database and a relational database interface.

That is, from the perspective of the user, the user believes that the target data being accessed with the search criteria is embedded in a particular infocube and the user makes the initial search query using the search criteria via the infocube's interface. The underlying data access layer triggers the processing of the relational database service where (as discussed above at 110) the search criteria is detected by the relational database service. At this point, the relational database service, at 120, dynamically and in real time transitions from the infocube interface to a relational database format. In essence, the infocube is a "virtual infocube" (as discussed above) from the perspective of the user. In some cases, the user may be provided an interface to actively define constructs that are called "virtual infocubes" for purposes of directly mapping an infocubes interface to a relational database backbone for the source or target data.

One technique for achieving the processing at 120 is depicted in the processing at 121-125. Specifically, at 121, the relational database service evaluates the search criteria in the infocube interface format for names and attributes for the constructs used in the search criteria. These names and attributes are then used to query metadata tables associated with the relational database, such as database table schemas. Matching names and attributes are then used to identify specific tables (data sources) and columns (fields) of those tables.

The metadata describes mappings between an infocube and its data constructs (objects) and the relational database and its data constructs (tables, columns, fields, etc.). The technique described is metadata driven. A user interface is also provided that allows administrators and users to add, modify, delete the infocube mappings included in the metadata. So, the metadata is managed and directly modified and it provides the mappings from the infocube data to the relational database data.

At 122, these identified relational database constructs are used to generate, produce, and assemble a SQL query that is processed against the relational database. In some cases, at 123, the SQL query is produced with a SELECT clause for the characteristics (attributes) and for select aggregations of the key figures, as defined in the original search criteria. Furthermore, at 124, the SQL query can be produced with a FROM clause that resolved a specific fact table and dimension tables that the SELECT clause uses. Still further, at 125, the SQL query is produced with a WHERE clause that enforces any filtering criteria identified in the original search criteria. So, an entire SQL query having a SELECT, FROM, and WHERE clauses are produced in response to evaluating the original search criteria in the infocube data format against the metadata of the relational database.

At 130, the relational database service then uses the relational database interface (such as via the constructed SQL query) to search the relational database and to acquire an answer set that conforms to the original search criteria and its original time-dependent constraint (time of day, day, week, day of week, month, quarter, year, various combinations of these items, etc.).

At this point, the relational database service has successfully transitioned an initial user's search query that was issued via an infocube interface access mechanism out of an infocube data model and into a relational database data model and acquired results (answer set).

Accordingly, at 140, the relational database service automatically and dynamically and in real time translates the answer set to a data format recognized by the infocube interface and the answer set is presented to the user for consumption or further manipulation.

One technique for achieving this is to use one transformation actions to format the relational data into constructs or formats recognized and expected by the infocube interface. These transformation actions are predefined and available to the relational database service to transform the relational data into the infocube expected data format. In some cases, this may even be done in an automated manner by using extensible markup language (XML), XML schema definitions (XSD), extensible style sheets language (XSL), and XSL transform (XSLT) applications. So, the relational database service can process some transformations for some infocube formats without ever having encountered that particular format; this can be done when the infocube format includes an XSD and XSLT's that the relational database service can automatically call upon while parsing the relational data answer set.

One technique, at 141, has the relational database service wrap the answer set in one or more SQL OUTER SELECT clauses to assist each group in being processed by a particular desired transformation action to automatically place the answer set in the data format used by the infocube interface.

It is now appreciated, how the interfaces of one data model and data access mechanism can be integrated with a disparate data model and its disparate data access mechanisms in a manner that is completely transparent to the end user. In other words, the interfaces of an infocube data access model and data access mechanism can be tricked via a virtual infocube to transition to an entirely different and disparate data access mechanism associated with a relational database. The data can be managed and supported using a relational database access mechanism and yet the users can access the data, generate reports for the data, and manage the data as if it were really in an infocube data format by using interfaces and application services associated with an infocube data model.

Figure 2:
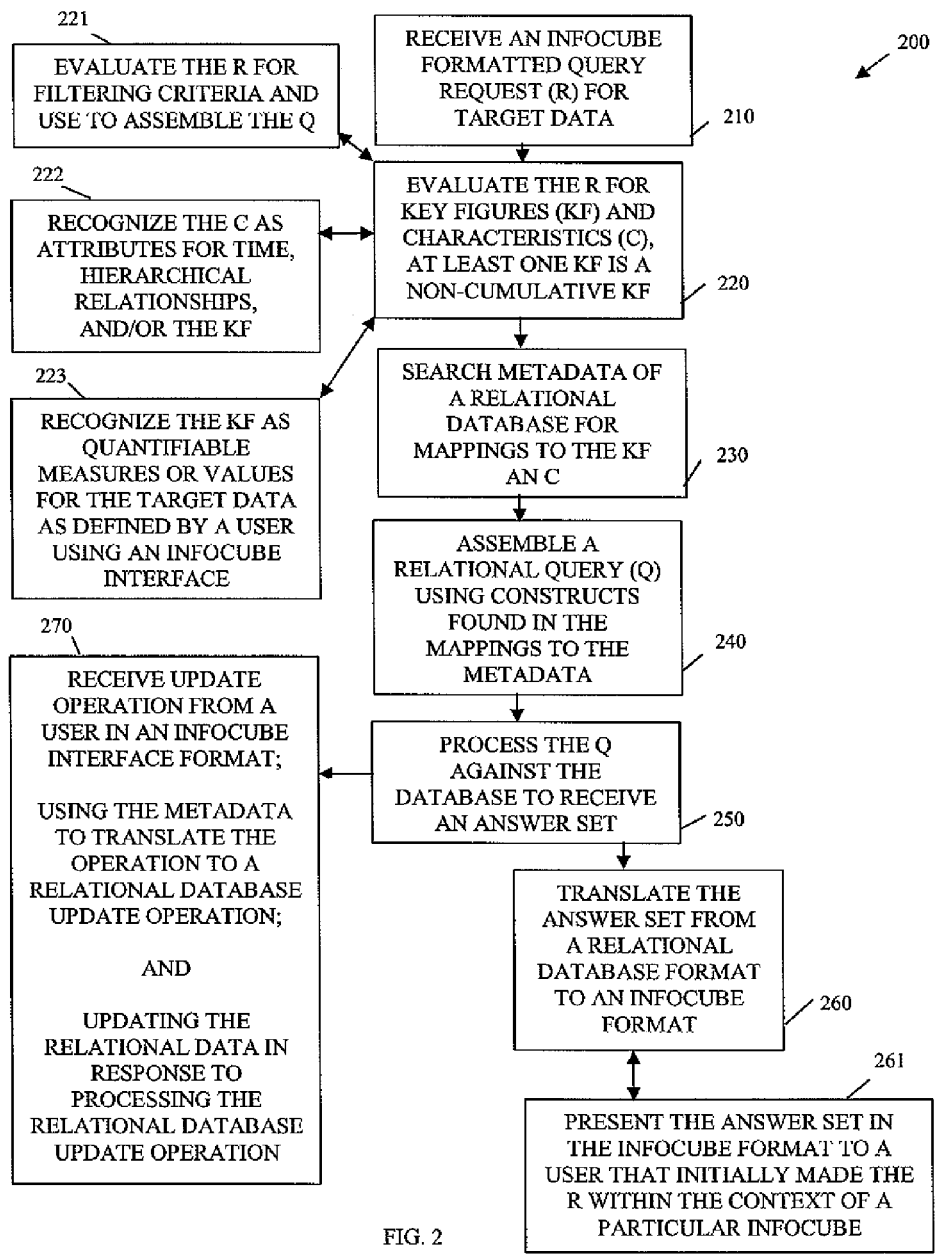
FIG. 2 is a diagram of another method for integrating disparate data access mechanisms, according to an example embodiment.

FIG. 2 is a diagram of another method 200 for integrating disparate data access mechanisms, according to an example embodiment. The method 200 (hereinafter referred to as "bridging service") is implemented in a machine-accessible and readable medium as instructions that when executed by a machine performs the processing depicted in FIG. 2. Moreover, bridging service is operational over a network, which may be wired, wireless, or a combination of wired and wireless.

The bridging service presents an enhanced and more detailed perspective of relational database service, which was presented with respect to the method 100 of the FIG. 1. The details of this enhanced processing are discussed more completely below.

At 210, the bridging service receives an infocube formatted query request for target data. Again, the manner in which this request is received can vary. For example, the bridging service may be configured to detect events being raised within an infocube interface. Alternatively, the infocube interface itself may be altered to provide active notification when the request is received. Still further the infocube interface may permit transferring processing of operations associated with data access via its own internal functions; in which case the processing is passed to the bridging service.

At 220, the bridging service evaluates the request for key figures defined within the request and for characteristics. At lease one key figure is associated with a non-cumulative key figure (discussed above).

In an embodiment, at 221, the bridging service also evaluates the request for filtering criteria, which is then used to assemble a relational database query (discussed below).

At 222, the bridging service can recognize the characteristics as attributes for time constraints and/or hierarchical relationship constraints. So, the characteristics can be independent of the key figures.

At 223, the bridging service can recognize the key figures as any quantifiable measure (calculation) or value for the target data as defined by the user, who uses the infocube interface to define the request. Again, the request includes the key figures.

At 230, the bridging service searches metadata associated with a relational database for mappings and other relational database constructs (tables, fields, columns, etc.) to the key figures and the characteristics. The key figures can be calculations as discussed above so the search is more than just a direct match or partial match on names or identifiers.

At 240, the bridging service assembles or generates a relational query using the constructs found in the mappings of the relational data metadata. At 250, the bridging service processes the query against the relational database to receive an answer set.

In an embodiment, at 260, the bridging service translates the answer set from a relational database format into an infocube format. At 261, the bridging service presents the answer set in the infocube format to the user. The user initially made the infocube formatted request within the context of a particular infocube that the user believed had the desired target data.

It is noted that the communication bridging achieved by the bridging service between two disparate data access mechanisms (namely the infocube and the relational database) does not have to be exclusively tied to data searching. That is, any data access operation can be bridged from the infocube data model to the relational data model and back.

For example, at 270, the bridging service receives an update operation from a user. The update operation is received in an infocube interface format and within the context of a particular infocube. The bridging service uses the metadata of the relational database to translate that infocube update operation into a specific relational database update operation. Next, the bridging service processes that relational database update operation by updating the relational database.

In fact, security (access permissions, authentication, etc.) can be enforced against the user at the infocube level, and if desired (based on policy) relied upon and trusted at the relational database level, such that a user is not even aware that different security policies are being employed when the user accesses the relational data via the infocube's interfaces. In some cases, it may be desirable to enforce separate security at both the infocube and the relational database levels.

Figure 3:
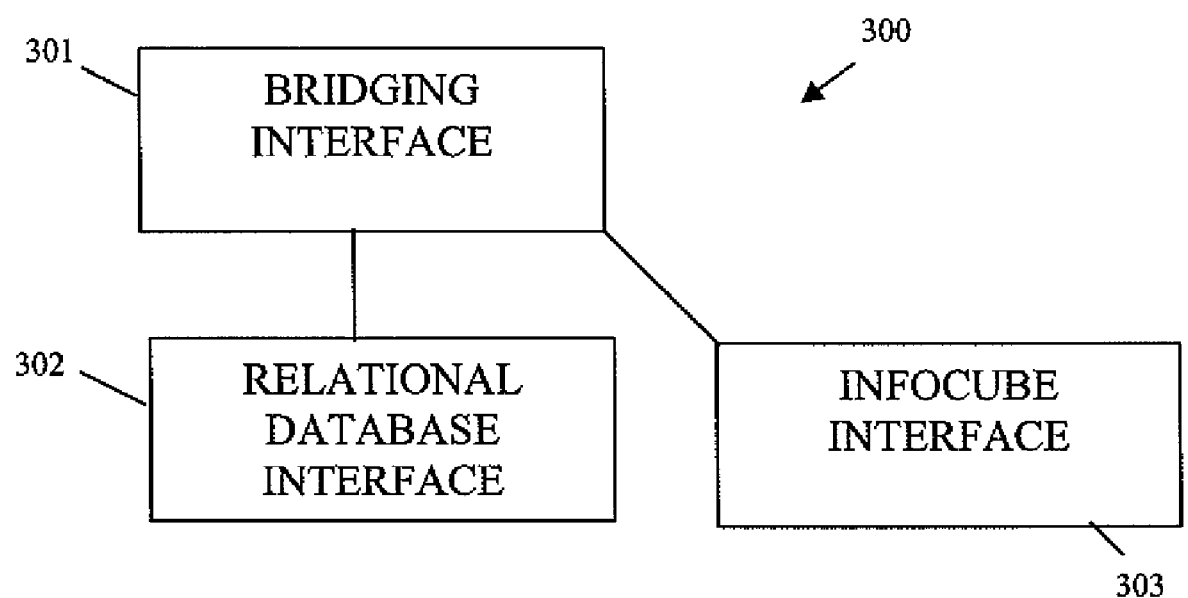
FIG. 3 is a diagram of a data access integration system, according to an example embodiment.

FIG. 3 is a diagram of a data access integration system 300, according to an example embodiment. The data access integration system 300 is implemented in a machine-accessible and readable medium as instructions that when executed by a machine performs a variety of processing, such as the processing discussed in detail above with reference to the methods 100 and 200 of the FIGS. 1 and 2.

The data access integration system 300 includes a bridging interface 301 and a relational database interface 302. Each of these and their interactions with one another will now be discussed in detail.

The bridging interface 301 is implemented within a machine-accessible and readable medium and is processed on a machine. Example processing associated with the bridging interface 301 was presented above in detail with respect to the methods 100 and 200 of the FIGS. 1 and 2, respectively.

The bridging interface 301 is to transparently supply data from a relational database and its relational database interface 302 to an infocube in an infocube's native data format via an infocube's interface 303 and vice versa.

An end user may or may not be aware of the bridging interface 301 and its activities that are being performed on behalf of a user. In cases where the user is aware, various graphical user interface (GUI) screens may be provided to a user to configure the bridging interface 301. Configuration can be used for specific relational database tables, specific infocubes, etc. In other cases, the end user does not have to be aware of the bridging interface 301 and can reap the benefits of the bridging interface 301 in the manners discussed above and below.

Specifically, the bridging interface 301 is activated within an infocube when the infocube interface 303 attempts to access data in some manner. Access can be associated with infocube create operations, infocube delete operations, infocube update operations, infocube query operations, infocube statistic gathering operations, and/or info cube status operations.

The bridging interface 301 then translates infocube formatted data operations and infocube data constructs into relational database formatted data operations and relational database data constructs, which are recognized and capable of being processed by the relational database interface 302.

The infocube data constructs include key figures and characteristics. At lease one key figure is a non-cumulative key figure or at least one characteristic is a temporal-based limitation. So, the operations being performed are more complex involving non-cumulative data values or temporal-based limitations.

In an embodiment, the bridging interface 301 produces SQL statements for the infocube formatted operations using metadata associated with the relational database and the key figures and the characteristics associated with the infocube data constructs.

In a particular implementation of the bridging interface 301, the bridging interface 301 is implemented as a Java service that monitors the infocube interface 303 for events indicating that attempts are being made to access the data of the infocube. This triggers the processing associated with the bridging interface 301 as discussed in detail above and herein.

According to an embodiment, the infocube is logically represented as a virtual infocube. It is virtual because the user produces the infocube formatted data operations and directs them to the infocube via the infocube interface 303. The bridging interface 301 transparently transforms the operations into relational database formatted data operations for access to the relational database via the relational database interface 302.

The relational database interface 302 is implemented within a machine-accessible and readable medium and is also to process on a machine.

The relational database interface 302 processes the data operations and data constructs (in relational database formats) against a relational database and returns results. Results may be an answer set, statistics, status information, and/or a confirmation that an update occurred. Therefore, the type of data associated with the results depends on the operation being performed against the relational database.

The bridging interface 301 further transforms or translates the results from a relational database format back into an infocube recognized format and presents the results to the user via the infocube interface 303.

One now appreciates how two entirely different and disparate data access mechanisms can be integrated in a manner that is transparent to a user. This permits a user to continue to use applications or interfaces that the user is familiar with and that the user finds value in, even when the underlying data model for the data being accessed is associated with an entirely different data access mechanism, such as relational database technology.

It is also noted that although the discussion presented herein provides examples for integrating the interfaces of an infocube to a relational database background that the reverse may occur as well. That is, a relational database front-end interface can be bridged to an infocube backbone, if such a scenario is desired.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
    receiving a search criteria via an infocube interface from a user, wherein the search query includes a time-dependent constraint, the search criteria is detected when the search criteria is initiated by the user via the infocube interface and a relational database service is initiated, the infocube interface is included with an infocube, the infocube is a customized package of information that includes its own internal data representation and the infocube interface for accessing that internal data representation;
    automatically transitioning from the infocube interface to a relational database via the relational database service having a relational database interface;
    using the relational database interface to search the relational database and to acquire an answer set that conforms to the search criteria having the time-dependent constraint; and
    automatically translating the answer set to a data format used and recognized by the infocube interface and presenting to the user within the infocube interface, the infocube is a virtual infocube presents to the user as an actual infocube but actual data access is achieved via pointers and translations to a relational database backbone via the relational database interface, where the data actually resides and is manipulated on behalf of the user from the relational database.

2. The system of claim 1, wherein automatically transitioning further includes evaluating the search query for key figures and filtering criteria defined therein and querying metadata tables of the relational database to map infocube constructs found in the search criteria to relational database constructs.

3. The system of claim 2, wherein using further includes assembling the relational database constructs into a SQL query and processing the SQL query as the search against the relational database.

4. The system of claim 3, wherein assembling further includes producing the SQL query with a SELECT clause for characteristics and select aggregations of the key figures.

5. The system of claim 4, wherein assembling further includes producing the SQL query with a FROM clause that resolves a fact table and dimension tables that the SELECT clause is to process against.

6. The system of claim 5, wherein assembling further includes producing the SQL query with a WHERE clause that enforces the filtering criteria.

7. The system of claim 1, wherein automatically translating further includes wrapping the answer set with one or more SQL OUTER SELECT clauses to process transformation actions on the answer set and automatically place it in the data format used by the infocube interface.

8. A machine-implemented method, comprising:
    receiving an infocube formatted query request for target data, an infocube is a customized package of information that includes its own internal data representation and includes an infocube interface for accessing the internal data representation, and the infocube formatted query request is directed to the infocube interface of the infocube:
    evaluating the infocube formatted query request for key figures and characteristics, at least one key figure is a non-cumulative key figure;
    searching metadata of a relational database for mappings to the key figures and the characteristics:
    assembling a relational query using constructs found in the mappings to the metadata of the relational database;
    processing the relational query against the relational database to receive an answer set: and
    enforcing separate security at an infocube level of access from that which is associated with a relational database level of access, the infocube is a virtual infocube that presents to a user as an actual infocube but actual data access is achieved via pointers and translations to a relational database backbone via a relational database interface, where the data actually resides and is manipulated on behalf of the user from the relational database.

9. The method of claim 8 further comprising, translating the answer set from a relational database format to an infocube format.

10. The method of claim 9 further comprising, presenting the answer set in the infocube format to a user that initially made the infocube formatted query request within an infocube interface and within a context of a particular infocube.

11. The method of claim 8, wherein evaluating further includes evaluating the infocube formatted query request for filtering criteria and using the filtering criteria in assembling the relational query.

12. The method of claim 8, wherein evaluating further includes recognizing the characteristics as including one or more of the following attributes: time constraints and hierarchical relationship constraints.

13. The method of claim 8, wherein evaluating further includes recognizing the key figures as quantifiable measures or values for the target data as defined by a user using an infocube interface.

14. The method of claim 8 further comprising:

receiving an update operation from a user in an infocube interface format for data defined within the infocube;

using the metadata to translate the operation to a relational database update operation for relational data that maps to the data; and updating the relational data within the relational database in response to processing the relational database update operation.

\* \* \* \* \*